(12) United States Patent
Olson

(10) Patent No.: US 7,775,483 B2
(45) Date of Patent: Aug. 17, 2010

(54) LAUNCH AND RECOVERY SYSTEM FOR TETHERED AIRBORNE ELEMENTS

(76) Inventor: Gaylord G Olson, 273 Jefferson Rd., Princeton, NJ (US) 08540

( * ) Notice: Subject to any disclaimer, the term of this patent is extended or adjusted under 35 U.S.C. 154(b) by 0 days.

(21) Appl. No.: 12/326,886

(22) Filed: Dec. 3, 2008

(65) Prior Publication Data

US 2010/0133385 A1 Jun. 3, 2010

(51) Int. Cl.
*A63H 27/08* (2006.01)
*A63H 27/10* (2006.01)
(52) U.S. Cl. .............................. 244/153 R; 244/155 A; 244/33
(58) Field of Classification Search ............... 244/1 TD, 244/33, 63, 153 R–153 A; 73/170.28
See application file for complete search history.

(56) References Cited

U.S. PATENT DOCUMENTS

| | | | | |
|---|---|---|---|---|
| 3,081,967 A | * | 3/1963 | Church | 244/31 |
| 4,058,010 A | * | 11/1977 | Woodhouse | 73/170.07 |
| 4,152,933 A | * | 5/1979 | Woodhouse | 73/170.07 |
| 4,402,479 A | * | 9/1983 | Phipps et al. | 244/116 |
| 4,497,272 A | * | 2/1985 | Veazey | 114/102.29 |
| 5,636,480 A | * | 6/1997 | Lauritsen et al. | 52/66 |
| 5,884,862 A | * | 3/1999 | Aurilio et al. | 244/1 TD |
| 6,010,093 A | * | 1/2000 | Paulson | 244/24 |
| 6,422,506 B1 | * | 7/2002 | Colby | 244/1 TD |
| 7,188,808 B1 | * | 3/2007 | Olson | 244/153 R |
| 7,287,481 B1 | | 10/2007 | Wrage et al. | |
| 2003/0025039 A1 | | 2/2003 | Fischer | |
| 2003/0140835 A1 | | 7/2003 | Wrage | |
| 2005/0017129 A1 | | 1/2005 | McDonnell | |
| 2005/0046197 A1 | | 3/2005 | Kingsley | |
| 2007/0001056 A1 | | 1/2007 | Gorrie | |
| 2007/0157868 A1 | | 7/2007 | Wrage et al. | |
| 2007/0228738 A1 | | 10/2007 | Wrage et al. | |
| 2007/0250226 A1 | | 10/2007 | Wrage et al. | |

FOREIGN PATENT DOCUMENTS

GB 2098948 A * 12/1982

* cited by examiner

*Primary Examiner*—Michael R Mansen
*Assistant Examiner*—Joshua J Michener
(74) *Attorney, Agent, or Firm*—LaMorte & Associates

(57) ABSTRACT

A launch and recovery system for a tethered airborne element is provided that launches and retrieves the tethered airborne element in a completely unattended manner. The system is comprised of a protective shroud for storing a tethered airborne element, a winch module for releasing the airborne element to fly into the air or retrieving the element from the air, and a bearing for enabling the control of launch and recovery. Optionally, the system is also comprised of a slip ring assembly for providing external power and/or control signals to the winch module. The system can also be equipped with instrumentation modules on the tether line to provide a radio link and high altitude weather information. These modules may also contain other sensors and actuators which will help stabilize the airborne element.

5 Claims, 5 Drawing Sheets

LAUNCH AND RECOVERY SYSTEM FOR TETHERED AIRBORNE ELEMENTS

FIELD OF THE INVENTION

The present invention generally relates to tethered airborne elements, and particularly relates to a system for launching and recovery of such elements.

BACKGROUND OF THE INVENTION

Among tethered airborne elements for purposes of high altitude anemometry, remote sensing, wide area imaging and/or power generation, the launch and retrieval of such elements requires extensive human intervention. This is true for both aerostat and aerodyne, or the combination of aerostat and aerodyne systems. For example, in order to launch a kite, a human being needs to manually take or release the airborne element from its storage before it can be launched. Similarly, retrieving a kite requires human assistance. So does storing a kite into its housing.

Further, there are various factors such as weather conditions that can affect the operation of tethered airborne elements. The determination for retrieving these airborne elements is usually made by a human based on the reading of ground weather conditions or weather forecasts.

It is therefore an object of the present invention to provide a system which can automatically launch and retrieve a single-line tethered airborne element in a completely unattended manner. Further, another objective of the present invention is to provide an inexpensive way to monitor high altitude weather conditions without a tower. Yet another objective of the present invention is to provide a system and method that can launch or retrieve a tethered airborne element automatically when the weather condition in the proximity of the airborne element falls within a predefined range. No tethered airborne element should be left uncovered and exposed to inclement weather when it is not in use. It is therefore another objective of the present invention to provide a covered storage as part of the launching and recovery system. It is yet another objective of the present invention to provide a system for stabilizing the airborne element during its launching and retrieval. It is further another objective of the present invention to provide a simple launch and recovery system for aerostat elements.

SUMMARY OF THE INVENTION

According to the present invention, the launch and recovery system is comprised of a protective shroud for storing a tethered airborne element, a winch module for releasing the airborne element to fly into the air or retrieving the element from the air, and a bearing for enabling the control of launch and recovery. Optionally, the system is also comprised of a slip ring assembly for providing external power and/or unidirectional or bidirectional sensor/control signals between a remote controller and the winch module.

According to one feature of the invention, all components of the launch and recovery system are weather protected and joined by a hollow tube. This provides a complete weather protected environment for the airborne element, bridle lines and tether line when the element is stowed.

According to another feature of the present invention, the system can be operated to directly release the airborne element from its protective shroud by releasing the tether line. If the airborne element is a kite, the weight of the kite will cause the kite to drop from the bottom of its protective shroud and fly by itself into the air from the force of the wind. If the airborne element is an aerostat such as a balloon or a combination of balloon and kite, the element will rise from the top of the shroud and rise into the air because it is lighter than air.

According to yet another feature of the invention, with the bearing, the system can rotate with the force of wind and the shroud will automatically adjust itself to the downwind direction, which makes it easy to launch and retrieve an airborne element that requires the wind to operate, such as a kite.

According to yet another feature of the invention, the system can retrieve the airborne element and stow it completely in its protective shroud. An advantage of this system over existing systems is that it integrates the launch, retrieval and storage of the airborne element so that it can be operated in a completely unattended mode. In inclement weather or a relatively inaccessible area or under other undesirable conditions, the airborne element can thus be operated without any human intervention.

According to yet another feature of the invention, the system may be equipped with airborne instrumentation modules on the tether line which provide accurate flight data and weather conditions in the proximity of the airborne element.

According to yet another feature of the invention, the airborne instrumentation module can be used to determine the ambient conditions as a basis for launching or retrieving decisions. In one aspect, the instrumentation module may contain sensors, whose readings in combination with ground weather conditions or weather forecasts will determine if the weather is reaching an unfavorable condition such that the airborne element should be retrieved. Upon such determination, the winch module is controlled to automatically retrieve and recover the airborne element. In another aspect, when the ground weather condition or the outcome of weather forecasts reaches again the operable range for the airborne element, the winch module can be controlled to automatically release and launch the airborne element from the shroud.

According to yet another feature of the invention, the airborne instrumentation module may contain payload electronics and sensors that can also provide other functions such as being used as an anemometer, providing a radio link relay etc. Further, the instrumentation module and winch modules can all be solar powered and radio controlled such that the system is operated in a completely self contained remote environment. Alternatively, the system can also be radio linked to a remote control or central monitoring station. Data can be captured from the instrumentation module and communicated back to the central station for analysis.

The present invention is advantageous over previous launch and recovery systems in that the present invention integrates a weather proof storage module along with the launch and recovery system. This allows a tethered airborne element to be operated in a completely unattended manner.

Further, the advantage of the present invention includes the automated weather assistance feature which makes the launch and recovery system applicable for a wide spectrum of tethered airborne elements. For example, the present invention can be used in a low wind condition (e.g. 0-12 miles per hour) that is suitable for a helium balloon. The present invention can also be used in a high wind condition (e.g. 10-40 mph) that is suitable for a kite or a similar device for power generation.

For a more thorough understanding of the invention, its objectives and advantages, refer to the following specification and to the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
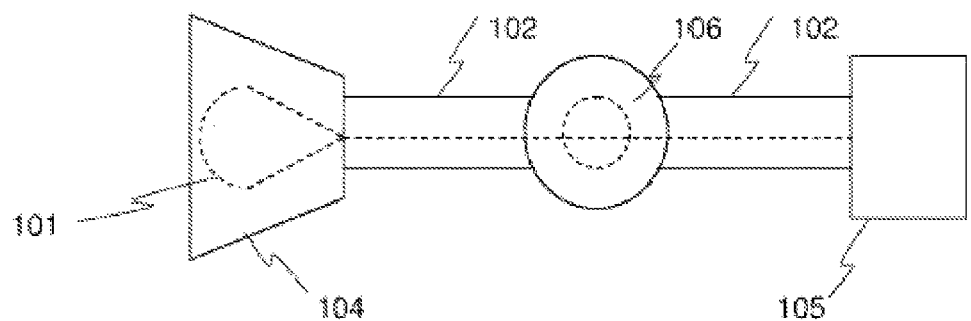
FIG. 1a is the top view of a physical configuration of the system in light of an exemplary kite application according to the present invention.
FIG. 1b is the side view of a physical configuration of the system in light of an exemplary kite application according to the present invention.
Figure 1:
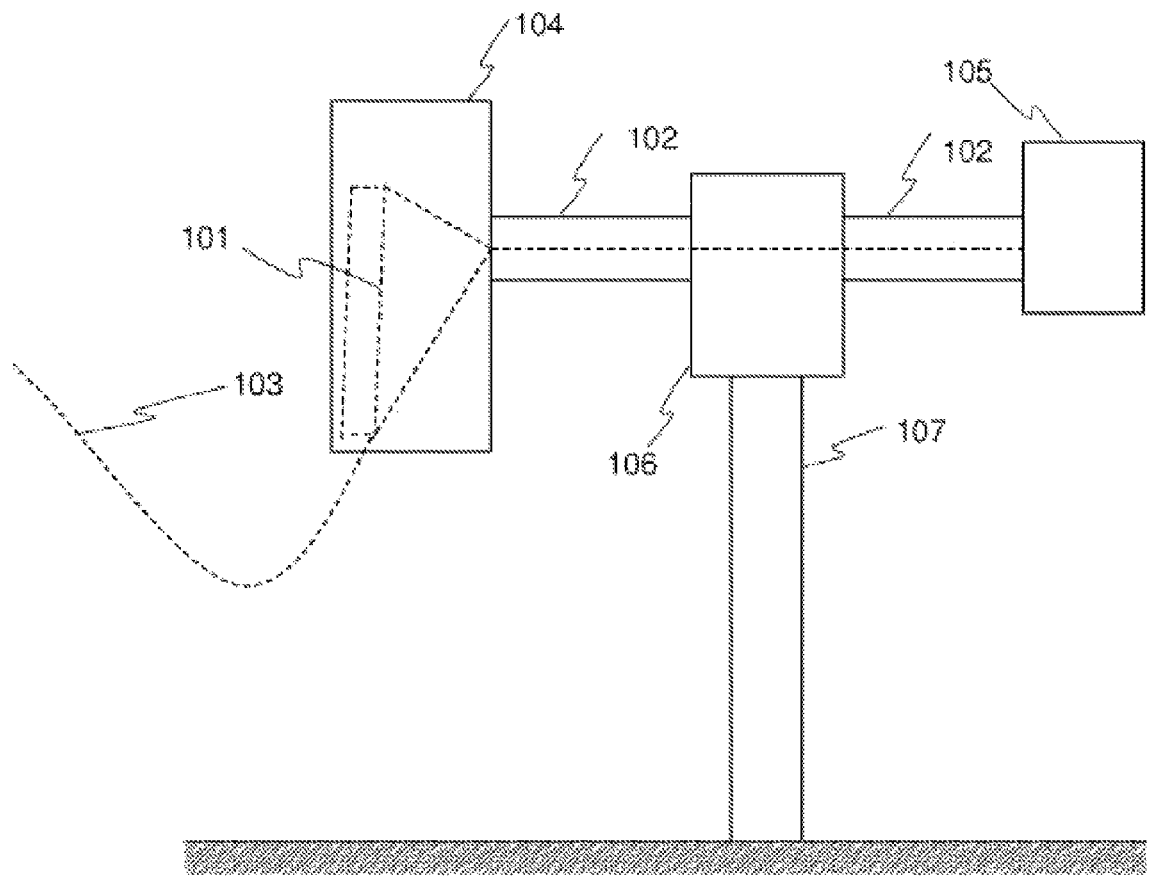

The following description of embodiment(s) is merely exemplary in nature and is in no way intended to limit the invention, application, or uses.

By way of overview, the present invention essentially discloses three main components: a protective shroud, a bearing and slip ring assembly and a winch module, as illustrated in FIG. 1a and FIG. 1b.

In reference to FIG. 1a and FIG. 1b, the arrangement of components is very similar to a small wind turbine system. A vertical tower 107 supports a horizontal hollow tube 102 at the top along with a bearing and slip ring assembly 106. At one end of the hollow tube is a winch module 105 which gives control of the extension of the airborne element tether line. At the other end of the hollow tube is a protective shroud 104 for the airborne element. The shroud has dimensions which will protect the airborne element 101 from inclement weather. Since the shroud is much larger than the winch module, it will also act as a tail vane (as used with small wind turbines). The wind force on the shroud will keep the hollow tube aligned with the wind vector direction such that the airborne element is always in the downwind position. This is shown in an exemplary application of the kite as in FIG. 2. We will assume that the shroud is closed at the top 202 but open at the bottom 203 and mostly open at the downwind side 204.

Figure 2:
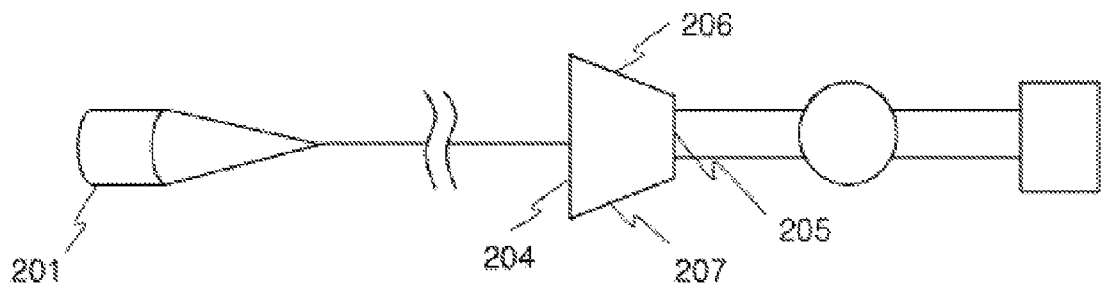
FIG. 2a is the top view of a physical configuration of the system in light of an exemplary kite application when the kite is airborne according to the present invention.
FIG. 2b is the side view of a physical configuration of the system in light of an exemplary kite application when the kite is airborne according to the present invention.
Figure 2:
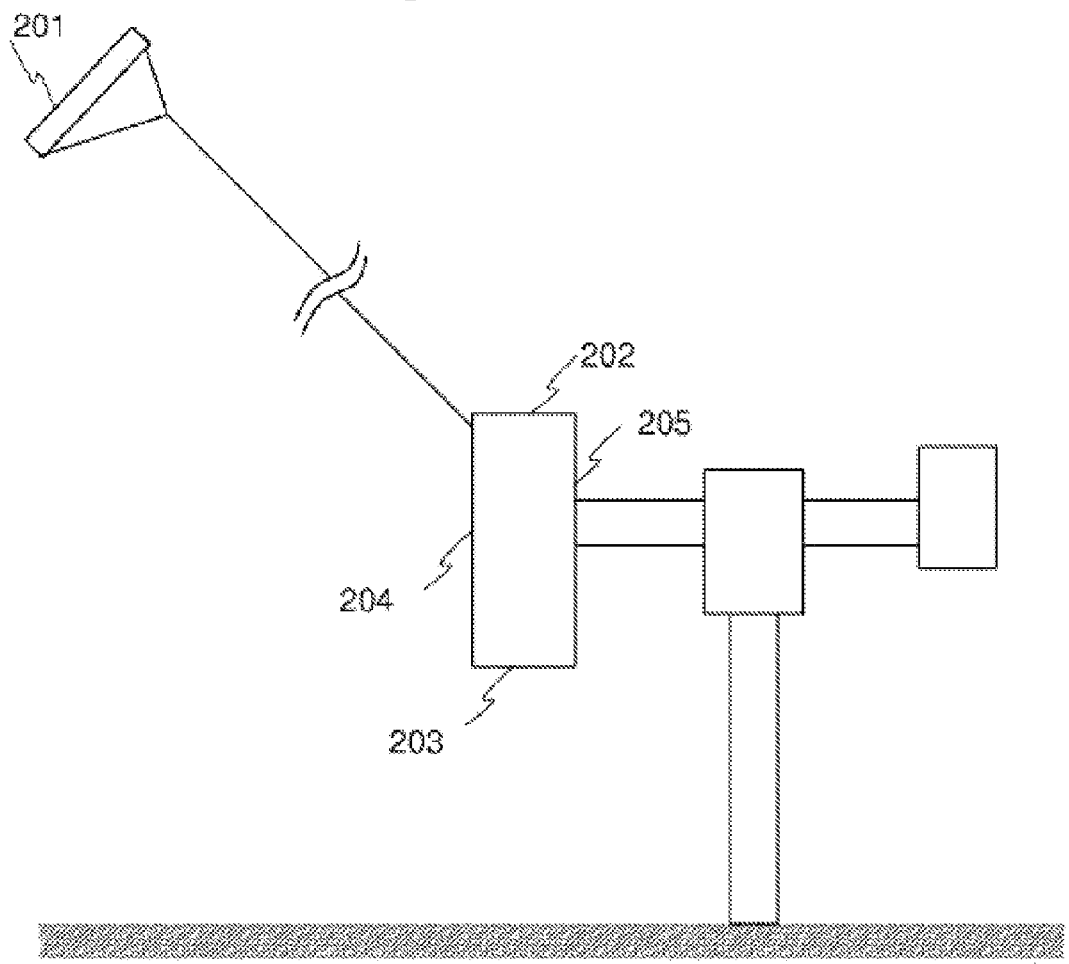

With the slip rings 106 indicated in FIG. 1, the winch module 105 can obtain external power. The winch module can also obtain control signals from some remote control unit (not shown). In addition, the slip ring assembly can also handle sensor signals in that data from the winch module can be transmitted to a remote computer. Thus, when it is desired to launch the airborne element 101, the winch would provide a gradual extension of the tether line. For an exemplary application of a kite 101 or similar airborne element, gravity would then pull the element down such that the bottom of the kite begins to appear below the shroud.

To minimize bending and friction of the tether line at the downwind end of the hollow tube, a roller fairlead might be used. When the kite is entirely below the shroud, the full force of the wind will cause the kite 101 to open and eventually move in an upwards and downwind direction (103). With this condition the tether line can be further extended until the kite is at its desired altitude.

It should be noted that this system could also be designed without the use of slip rings and external power. One concept for this would be to use a battery and radio receiver at the winch module. In this case, a radio link from a remote control unit would provide signals to control the winch. The battery in the system could be recharged with solar photovoltaic panels on the winch module and/or shroud. Also, a small wind turbine rotor and generator could be used at the windward side of the winch module. This would cause the system to look ever more like a conventional small wind turbine. Power generation near the winch provides independence from the power grid.

Many different types of tethered airborne elements can be used with the system described above. For example, both aerostat and aerodyne or any combination thereof can be used. For illustration purposes, a simple, single-line sled kite in the air with two bridle lines is shown in FIG. 2a and FIG. 2b.

With the system as described above, the kite launch and recovery could be controlled by someone directly viewing the system as with radio controlled model airplanes. If even more remote control is desired, there might be one or more video cameras viewing the system, in which case the control might be done from a location many miles away.

Another consideration for this system is a more complete automation of the launch and recovery process. With one or more video cameras monitoring the system, a computer with image processing capability could replace the human being in the feedback control loop. These cameras could be placed some distance away from the launch tower, or they could be placed on the rotatable assembly at the top of the tower. In order to give a high contrast for the kite (at least at short distance) we could use retroreflective tape on the kite along with light emitting diode illumination at the camera.

We will assume that the kite in this system will be in the air only for a specific range of wind speeds and weather conditions. We might utilize the hourly wind forecasts at a website (for example www.weather.com) and/or a local ground-based weather station. Also, if a small wind rotor is used for battery charging, it would also serve as a local anemometer.

As an exemplary application for this system, we might consider its use as a high altitude anemometer for wind farm planning. For this purpose we might need to measure wind speed at 400 to 600 feet above ground with a wind speed range of 10 to 30 miles per hour. For cost effective wind power, speeds less than 10 mph are not significant. Since the wind speed near the ground is generally less than that at 500 feet above ground, we might have a goal to have the kite in the air whenever the wind speed near the ground is predicted to be between 8 and 28 mph. Of course, any significant storm prediction would require the kite to be kept in its shroud regardless of wind speed. With dependable weather and wind forecasts, and with computer cameras giving accurate kite locations, the launch and recovery process could be fully automated, through computer control of the winch.

Thus far we have considered only two types of sensors for the system: one or more cameras and a low altitude conventional anemometer in use with a ground-based weather station. A question arises as to which types of sensors or sensing methods could provide a wind speed measurement at the kite location at a high altitude hundreds of feet above ground. There are several ways to do this:

1. Measure the tension in the tether line near the ground;

2. Use one or more load cells (or strain gauges) between the kite and the top of the tether line;

3. Use some form of independent miniature anemometer on or near the kite. Method 1 above might be simplest but it will have an error due to uncertain forces along the full length of the tether line. Methods 2 and 3 above will require either data storage at the sensor location or a radio link to a ground based computer.

A simple way to implement method 1 above would be to use a torque sensor on the rotation axis of the winch. Another useful sensor would be a shaft encoder on the winch. This would give an indication of how much tether line has been let out. For this to work well we might use a level wind mechanism as part of the winch (similar to those on fishing reels). The data from the torque sensor or the shaft encoder on the winch can be transmitted to a remote computer via a slip ring or a radio link.

Figure 3:
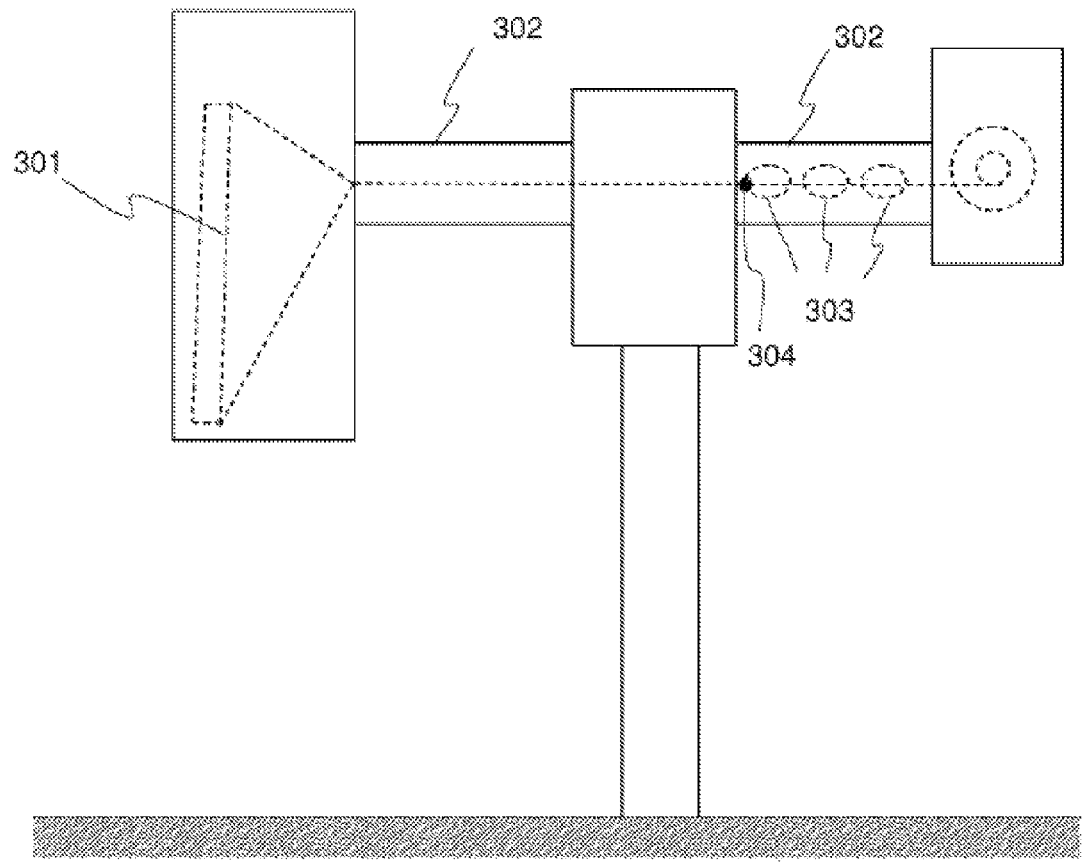
FIG. 3 is an illustration of a system with airborne instrumentation modules in light of an exemplary kite application according to the present invention.
Figure 4:
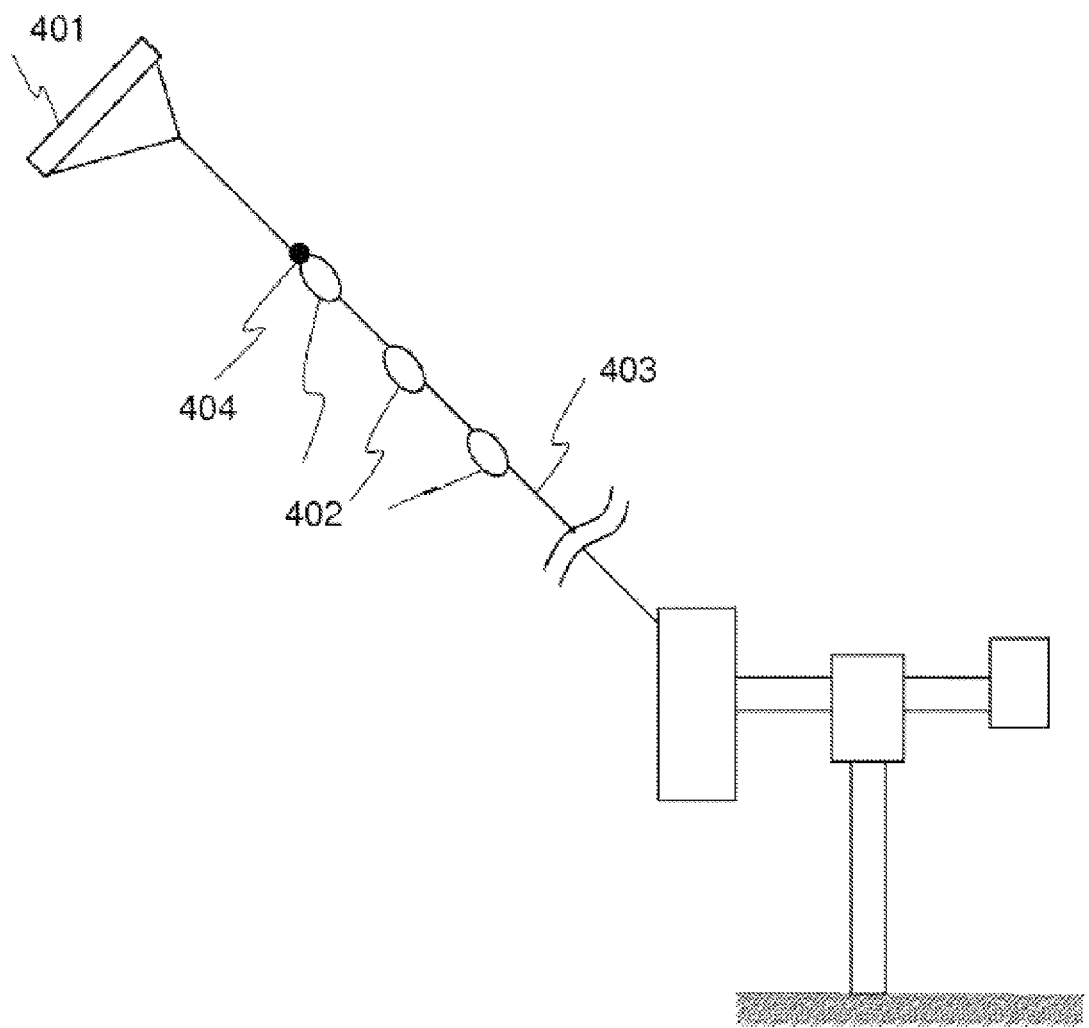
FIG. 4 is an illustration of a system with instrumentation modules in light of an exemplary kite application when the kite is airborne according to the present invention.

In reference to FIGS. 3 and 4, for an exemplary kite or similar application, methods 2 and 3 in the list above might require a combination of sensor/radio module at the point 304 and 404 where the two kite bridle lines attach to the tether line 403. When the kite 301 and 401 is fully inside the shroud, this point 304 and 404 would be located very near the winch, as in FIG. 3. What this implies is that the instrumentation module must have dimensions small enough to fit through the rectangular aperture of the roller fairlead. It must also have a weight small enough to be held aloft by the kite at the minimum desired wind speed.

Figure 5:
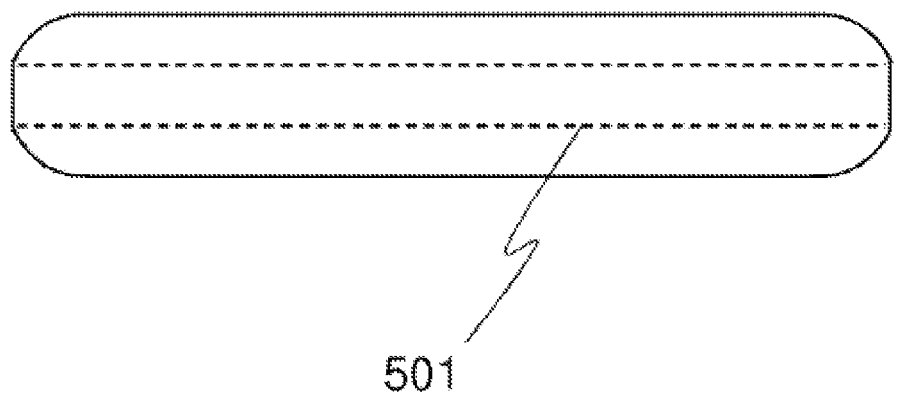
FIG. 5a and FIG. 5b are illustrations of an instrumentation module according to the present invention.
Figure 5:
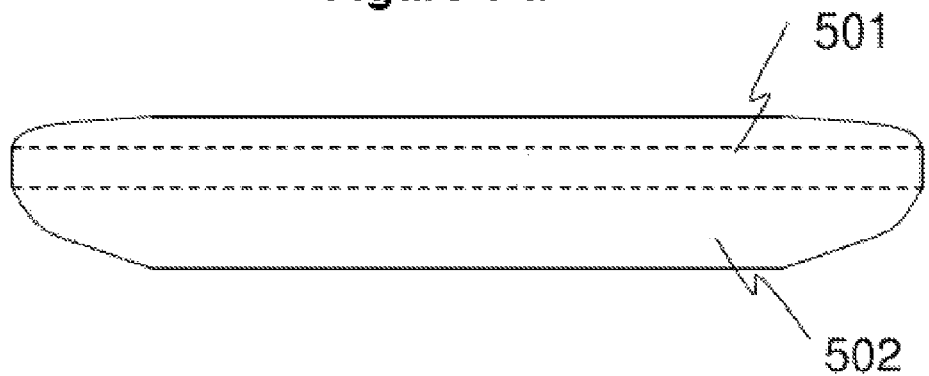

The instrumentation module is further explained in reference to FIG. 5a and FIG. 5b. It is simply a cigar shaped enclosure with a small hollow tube 501 going through it in the long direction. The payload electronics and sensors would be in the bottom portion of the enclosure 502. The hollow tube 501 would have an inner diameter slightly larger than the tether line diameter, so the line would easily slip through the tube. Any knot in the line, however, would cause the module to move out and up when more line is let out. The outer diameter of the module would be slightly smaller than the width and height of the roller fairlead aperture, so the force from the kite and the wind would pull the module out and up into the air. As an alternate attachment method, there could be a small gear-motor in the module which could be used to clamp the module onto the tether line at some desired time and/or location. This might be controlled by a computer through a radio link.

Additional useful sensor types to be considered as part of the instrumentation module are those listed below:

1. accelerometers;

2. gyroscopes;

3. altimeter;

4. thermometer;

5. magnetometer (compass);

6. miniature cameras.

In order to provide power to the instrumentation module and radio link we might use solar cells and a battery, or perhaps a rotating miniature turbine (rotor) driving a small generator. This last power source would also give a wind speed measurement.

Sensors 1 and 2 in the list above would allow a computer to perform an inertial measurement unit (IMU) function and thereby keep track of the kite location and orientation at all times. In this case sensors 3 and 5 in the list might serve in a redundant, backup role. We should note that many other sensor types and mounting locations can be used in this system. Any kite with solid spars (such as a sled kite) could use hollow tubes for spars and thus have sensors, electronics and batteries inside these tubes.

Further in reference to FIGS. 3 and 4, the top instrumentation module is the closest to the point 304 and 404 where the two kite bridle lines attach to the tether line 403. This instrumentation module can be attached at three places: two places at the top where the kite bridle lines connect, and a third place at the opposite end of the module which would be the top end of the tether line. The differential bridle line lengths might be controlled from within this module to provide a stabilizing function for the kite during its launch, airborne operation, and recovery processes. The control of differential bridle line lengths can be realized by a motor which is controlled by an onboard computer or by a remote computer via a radio link. The computer reads from an onboard sensor or a camera in order to monitor the stability of the kite and issues appropriate commands to the motor in order to maintain the stability of the kite.

VARIATIONS OF EMBODIMENT

The above describes only one embodiment. Variations of this design can also be made to accomplish the same functions.

In another embodiment according to the present invention, for an aerostat application, such as with a helium balloon or other elements which are lighter than air, we will assume that the shroud is closed at the bottom 203 (in reference to FIG. 2) with ventilation holes to keep the shroud from accumulating moisture. At the top 202 (in reference to FIG. 2) it has a lid that opens when the balloon is being launched or retrieved and closes when the balloon is fully retrieved into the shroud for storage. The operation of the lid opening and closing is in sync with the operation of the winch in such a way that before the balloon is to be released from the shroud the door opens; and after the balloon is retrieved completely into the shroud the door closes.

During the launch operation, when the winch provides gradual extension to the tether line, the tethered airborne element begins to float above the shroud. This is because an inflated helium balloon or any similar combination of balloon and kite, or any other type of aerostat element is lighter than air.

Similarly to the exemplary kite application, a roller fairlead can also be used to minimize bending and friction of the tether line. When the shroud lid opens, the balloon will rise by itself due to its buoyancy. The tether line can be further extended until the balloon is at its desired altitude.

In another embodiment according to the present invention, an inflation/deflation apparatus can be equipped with the system to provide quick launch and recovery of the airborne element.

In yet another embodiment according to the present invention, instead of a horizontal hollow tube connecting between the slip ring assembly and the winch module, it can also be in a vertical orientation or at other angles with the winch module being significantly above or below the level of the slip ring assembly. For example, the winch module can be installed near ground level with a vertical hollow tube connecting to the slip ring assembly. In another example, the support tower can be used as a hollow tube with the winch module as the base of the support. The base of the support is rotatable so the system can orient itself with the wind. In this case, the slip ring assembly would be installed between the winch module and the ground.

In yet another embodiment according to the present invention, for aerostat elements the system can be installed over any existing structure (e.g. the top of a wall or a building) thus the support tower can be eliminated. Further, because the wind is not needed in order to launch an aerostat element, the rotating feature of the launch and recovery system may be superfluous. Therefore, the bearing, slip ring assembly and hollow tube might be eliminated. In this case, a shroud directly connecting/attaching to a winch module would be sufficient to realize the same functions as described above.

The description of the invention is merely exemplary in nature and, thus, variations that do not depart from the gist of the invention are intended to be within the scope of the invention. For example, the system can rotate either with the force of wind or with a motor and a wind sensor to orient it in the right direction. Still further, the connecting element between the shroud and the winch module can be a square or rectangular tube in lieu of a round tube. Still further, the hollow tube can be two tubes: one connecting the shroud to the bearing and slip ring assembly and the other connecting the bearing/slip ring assembly to the winch module. Still further, the airborne element does not need to have bridle lines in order to use the present invention. In this case, the tether line directly connects to the airborne element in lieu of the end of bridle lines. Still further variations, including combinations and/or alternative implementations, of the embodiments described herein can be readily obtained by one skilled in the art without burdensome and/or undue experimentation. Such variations are not to be regarded as a departure from the spirit and scope of the invention.

What is claimed is:

1. A system comprising:
    an aerostat selected from a group consisting of kites and balloons;
    a hollow tube having a first end and a second end;
    a vertical tower for supporting said hollow tube at an elevated height, wherein said hollow tube is free to rotate about said vertical tower;
    a winch coupled to said second end of said hollow tube; wherein said winch rotates with said hollow tube about said vertical tower;
    a protective shroud structure coupled to said first end of said hollow tube, wherein said protective shroud rotates with said hollow tube about said vertical tower, and wherein said protective shroud structure is sized to receive said aerostat therein; and
    a tether connecting said aerostat to said winch, wherein said tether extends into said protective shroud structure and through said hollow tube.

2. The system according to claim 1, wherein said protective shroud structure has a larger profile than said winch, therein causing said protective shroud structure, said hollow tube and said winch to rotate about said vertical tower in a wind so that said winch is oriented toward said wind.

3. The system according to claim 1, further including an instrumentation module coupled to said tether.

4. The system according to claim 1, wherein said winch selectively winds and unwinds said tether, therein altering the length of said tether between said aerostat and said winch, thereby enabling said aerostat to be autonomously launched and recovered by selectively controlling said winch.

5. The system according to claim 1, wherein said winch pulls said aerostat into said protective shroud structure when said tether is fully wound.

* * * * *